US006427865B1

(12) United States Patent
Stillwell et al.

(10) Patent No.: US 6,427,865 B1
(45) Date of Patent: Aug. 6, 2002

(54) AUTOMATIC PILL DISPENSER

(76) Inventors: Kenneth Stillwell, 1137 County Rd. 1763, Joppa, AL (US) 35087-2252; Kenneth Stillwell, Jr., 268 Bonds Chapel Rd., Albertville, AL (US) 35950

( * ) Notice: Subject to any disclaimer, the term of this patent is extended or adjusted under 35 U.S.C. 154(b) by 0 days.

(21) Appl. No.: 09/713,103

(22) Filed: Nov. 14, 2000

Related U.S. Application Data

(63) Continuation-in-part of application No. 09/293,090, filed on Apr. 15, 1999, now abandoned.
(60) Provisional application No. 60/081,871, filed on Apr. 15, 1998.

(51) Int. Cl.[7] .......................... G07F 11/00; G07F 11/12; B65G 59/00; B65H 3/00

(52) U.S. Cl. .............................. 221/4; 221/7; 221/113; 221/119; 221/133

(58) Field of Search ............................... 221/2, 3, 4, 5, 221/7, 13, 79, 82, 86, 113, 119, 120, 121, 133

(56) References Cited

U.S. PATENT DOCUMENTS

| | | | | | |
|---|---|---|---|---|---|
| 4,207,992 | A | * | 6/1980 | Brown | 221/15 |
| 5,014,875 | A | | 5/1991 | McLaughlin et al. | |
| 5,176,285 | A | * | 1/1993 | Shaw | 221/3 X |
| 5,323,929 | A | * | 6/1994 | Marlar | 221/3 X |
| 5,441,165 | A | * | 8/1995 | Kemp et al. | 221/2 X |
| 6,053,358 | A | * | 4/2000 | Tong | 221/151 X |

* cited by examiner

*Primary Examiner*—Joseph E. Valenza
*Assistant Examiner*—Gene O. Crawford
(74) *Attorney, Agent, or Firm*—Lanier Ford Shaver & Payne, P.C; Gerald M. Walsh

(57) ABSTRACT

A device and method for dispensing pills or vitamins is disclosed which includes a rotatable chamber within a housing. The chamber contains multiple slots for storing the pills or vitamins, and the housing has at least one dispensing hole so that pills will fall from the containment slot when it is aligned with the hole. The chamber may be rotated by motorized or manual means, with the preferred motorized means being an electric motor connected to a worm drive that engages gear teeth along the edge of the chamber, and the preferred mechanical means being a handle with a hinged tab.

16 Claims, 10 Drawing Sheets

AUTOMATIC PILL DISPENSER

CROSS REFERENCE TO RELATED APPLICATIONS

This application is a continuation-in-part of prior pending U.S. patent application Ser. No. 09/293,090, filed Apr. 15, 1999 now abandoned, which claims the benefit of Provisional Patent Application Ser. No. 60/081,871, filed Apr. 15, 1998. This continuation-in-part application also claims the benefit of an earlier filed PCT Application No. PCT/US00/09328, filed Apr. 7, 2000, by the same inventors.

BACKGROUND OF THE INVENTION

This invention relates generally to a method and device for dispensing pills or vitamins. More particularly, this invention relates to a novel device for automatically dispensing pills or vitamins that absolves the need for removing caps from bottles.

Many people, particularly the elderly, consume pills, vitamins, natural herbs, and/or other dietary supplements on a daily basis. The consumption of such pills ordinarily requires removing the screw cap from a small bottle. This can become quite cumbersome when performed on a daily basis, and, for individuals with arthritis or other ailments impairing the dexterity of their hands, it can develop into a challenging, if not impossible, task. Further exasperating efforts of the pill taker are the standard child safety caps, a required feature of most medicines, which are designed to prevent children from opening the bottles and accidentally consuming the medicine. Such caps often require the application of extra force, or the manipulation of small plastic parts, which can be extremely difficult for a person suffering from arthritis or similar afflictions.

Thus, there is a need for a system of automatically dispensing pills and vitamins that will avoid the problems associated with opening and closing several small bottles on a daily basis. Such a system should simply and reliably dispense pills. The present invention is designed to address this need.

SUMMARY OF INVENTION

The present invention is a pill dispensing device designed to obviate the need for repetitive opening and closing pill containers. The device consists of a housing, a dispensing chamber, and means for rotating the chamber such that pills or vitamins are easily dispensed to the user.

One of the advantages of the invention is to provide a rotating chamber with a plurality of slots to contain pills to be dispensed to a user.

Another advantage of the invention is to provide a pill dispensing device that can be manually or automatically advanced such that the user's pills are dispensed.

Another advantage of the invention is to provide a pill dispensing device that contains a removable rotating chamber that can be filled with the desired pills directly by a pharmacist or a pill manufacturer.

Another advantage of the invention is to provide a pill dispensing device that contains a plurality of rotating cylinders such that a variety of pills can be dispensed.

Another advantage of the invention is to provide a pill dispensing device that contains a safety feature such that the pills are not dispensed without the use of a special key or computer code.

DETAILED DESCRIPTION OF THE INVENTION

Figure 1:
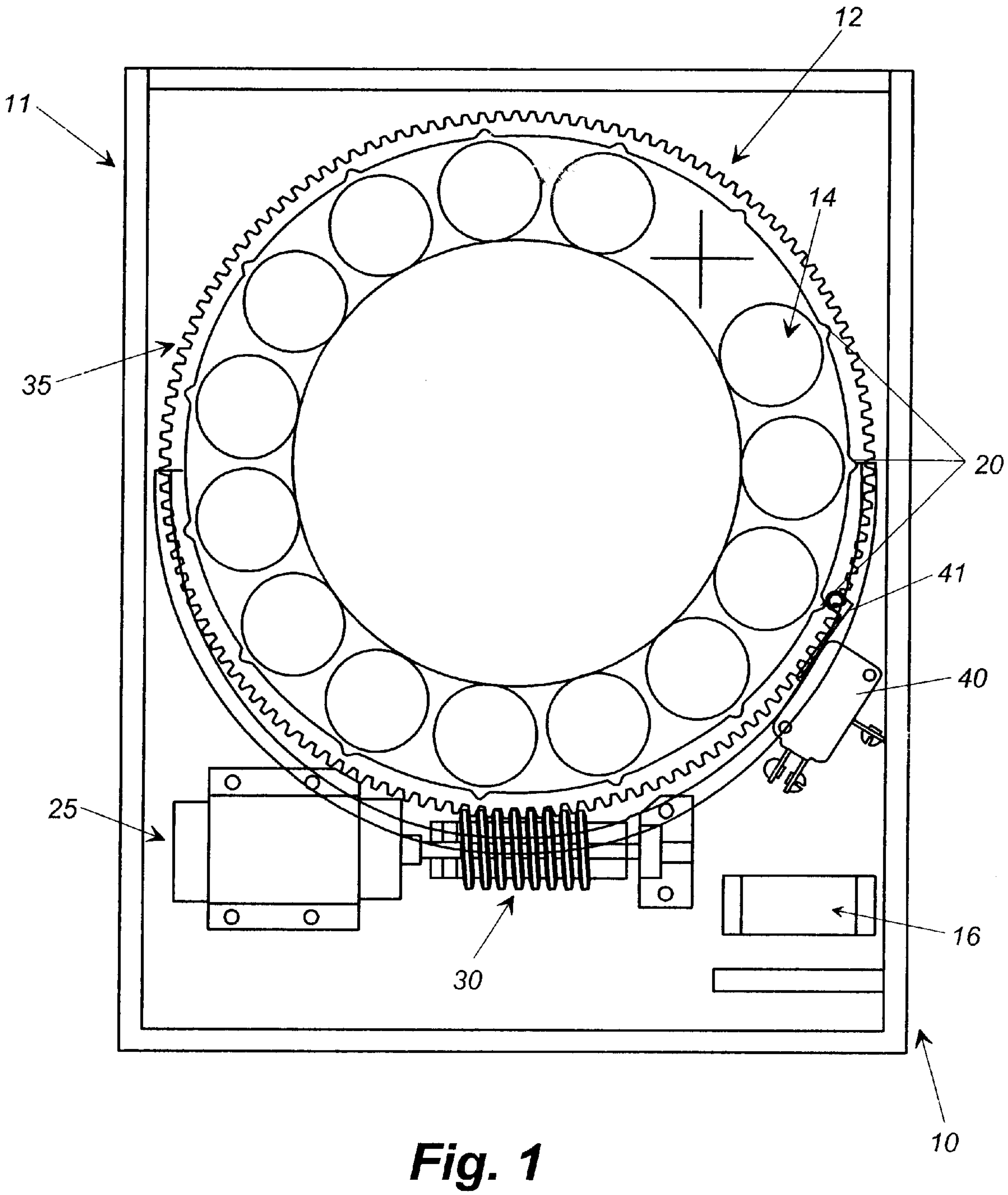
FIG. 1 is an overhead view of one embodiment of the present invention.

The present invention preferably relates to a device for automatically dispensing pills, vitamins, natural herbs, etc. As used in the specification and the appended claims, the term Apill@ shall mean any ingestible pill-like item, whether it be medicine, vitamins, or herbs and the like. Referring to FIG. 1, the device 10 consists of a housing 11 that holds the dispensing chamber 12. The dispensing chamber 12 is a rotating chamber with a multitude of pill containment slots 14 in which the pills are placed. The pill containment slots 14 may be any size or shape, so long as there is at least one opening through which pills will be dispensed. Multiple openings may also be used. The slots 14 may be designed to hold a single pill, or a multitude of pills, and may be any size to fit the intended purpose. The chamber 12 can have any number of slots 14, but it is preferable to use a number of slots 14 that will match the calendar in some way so that the chamber 12 is refilled by the user on a regularly scheduled basis. For example, the chamber 12 may have slots 14 in multiples of seven (7) so that the chamber 12 is refilled on a weekly or bi-weekly basis. Alternatively, the chamber 12 may have thirty (30) slots so that the dispenser is filled monthly. Those of skill in the art will readily recognize that any number of slots 14 may be useful in the present invention.

Figure 2:
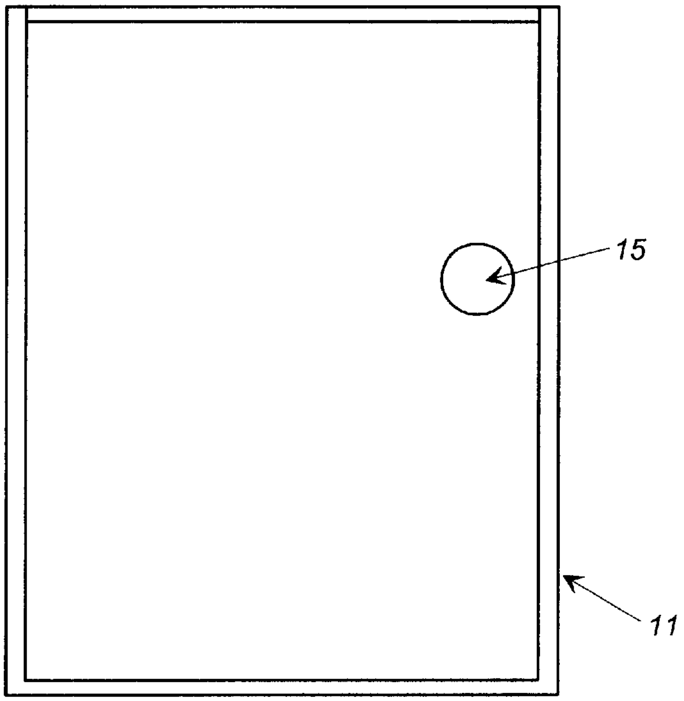
FIG. 2 is a bottom view of the housing without the rotating cylinder and related accessories showing the pill dispensing hole in the housing.
Figure 3:
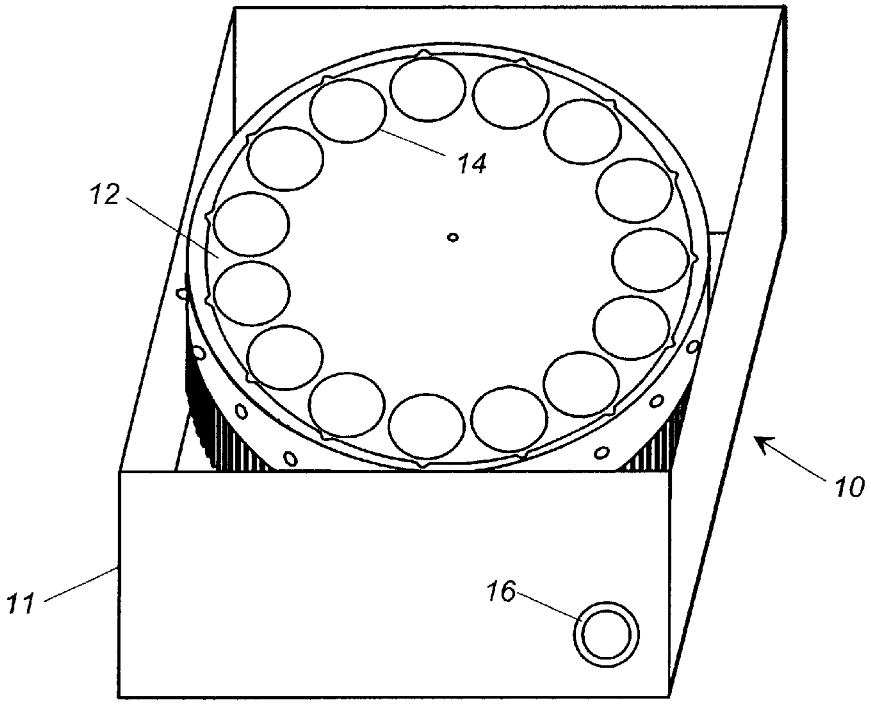
FIG. 3 is a depiction of one embodiment of the present invention.

The housing 11 includes a pill dispenser or hole 15 at the bottom (see FIG. 2) through which the pills are dispensed. The chamber 12 is designed to rotate so that one slot 14 will align with the dispensing hole 15 and the pill will fall from the slot 14 and through the hole 15. Any commonly known means for rotating the chamber may be used. The means for rotating the chamber may be a completely mechanical system requiring a user to manually rotate the chamber or an automated system requiring minimal or no user input. One such means contemplated for the present invention is a battery operated motor 25. The motor may be activated by a standard electric switch 16 located on the housing 11. In FIG. 1, the switch 16 is in the form of a small button. The user may depress the button, causing the chamber 12 to rotate, until the next slot 14 is aligned with the hole 15 and a pill is dispensed. The device 10 may also use standard electricity from a household outlet to operate the motor. In the alternative, those of skill in the art will recognize that the chamber may remain stationary and the housing designed to rotate. Such a system is considered within the spirit and scope of this invention. The device preferably includes a lid or cover to protect the chamber from dust or other contaminants.

Figure 4:
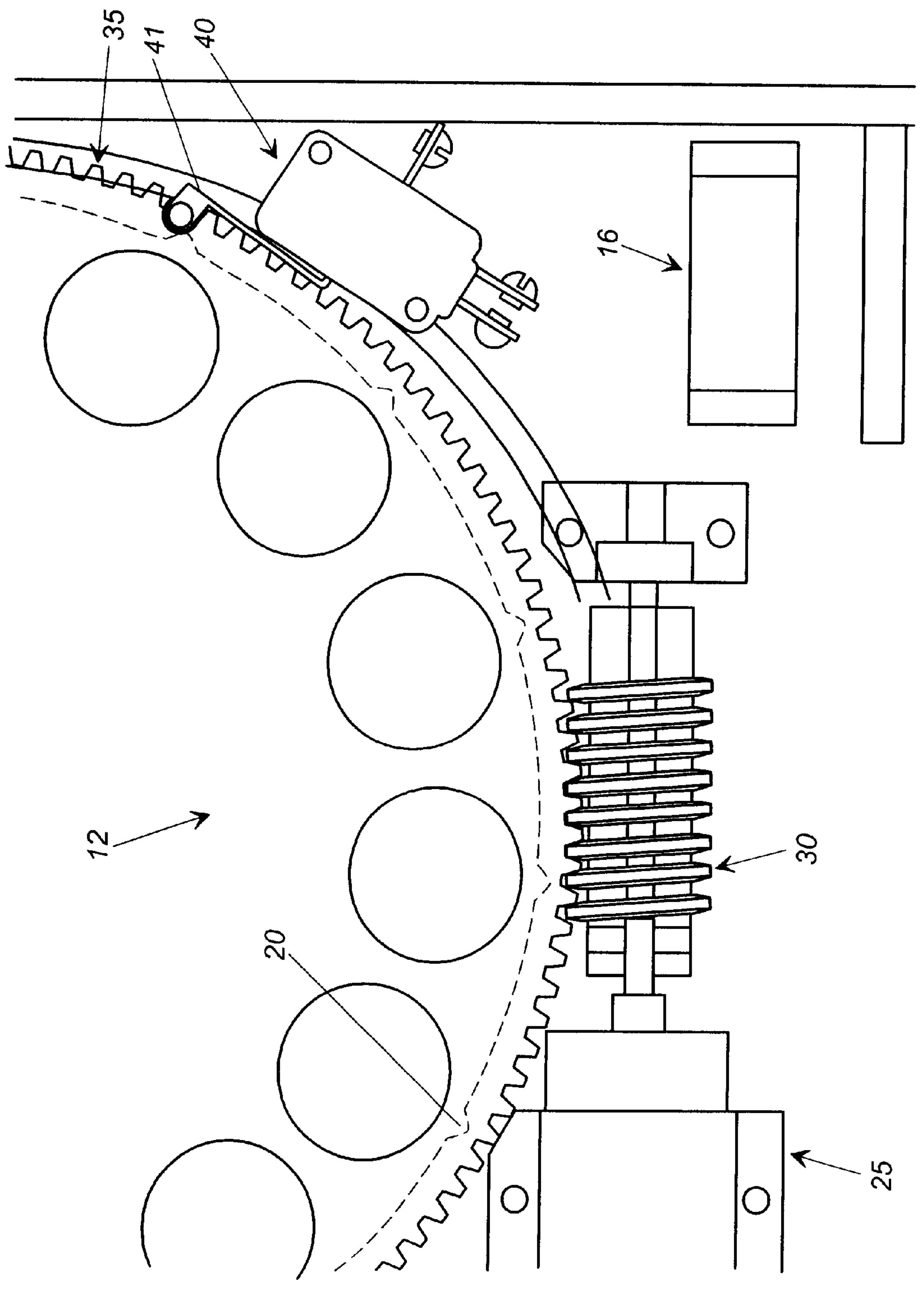
FIG. 4 displays the gear mechanism used to control the rotation of the chamber.

As will be readily apparent to those of skill in the art, there is no limit to the shape or configuration of the chamber in the present invention. Any chamber capable of rotating in such a manner that pills will fall through the dispensing hole is considered within the spirit and scope of this invention. The rotation of the chamber may be accomplished through any known means, and those of skill in the art will recognize a variety of known means that may be employed. However, known means are complex and expensive. Referring now to FIG. 4, a simple and inexpensive way to accomplish the chamber rotation is through the use of a chamber 12 having gear teeth 35 whereby a corkscrew mechanism 30 (worm gear or screw drive) engages the gear teeth 35 on the chamber 12. When the user activates the electric switch 16, the corkscrew mechanism 30 rotates, advancing the chamber. The corkscrew gear 30 is attached to a shaft on motor 25. The shaft and corkscrew gear 30 are parallel to the chamber wall to facilitate the motor 25 and worm gear 30 being placed adjacent to the chamber wall to conserve space and make the pill dispenser compact. Alternatively, the rotation may be accomplished by attaching the motor 25 directly to the rotating chamber 12.

Figure 5:
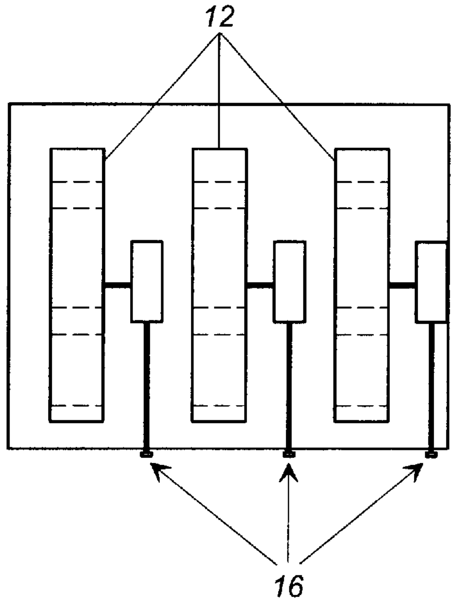
FIG. 5 displays an alternative, multiple pill embodiment of the present invention.

Another possible embodiment of the present invention involves multiple chambers within 5 a single housing so that a variety of pills may be dispensed from a single unit. Such an embodiment is shown in FIG. 5. In FIG. 5, three chambers 12 are aligned for vertical rotation, rather than the horizontal configuration illustrated previously. In this configuration, the slots 14 may have holes in the side, or on one end, and such holes will align with dispensing holes 15 at the bottom of the housing 11 as discussed above. The multiple chambers could also have a horizontal configuration, 10 but this would require an extremely large housing.

Figure 7:
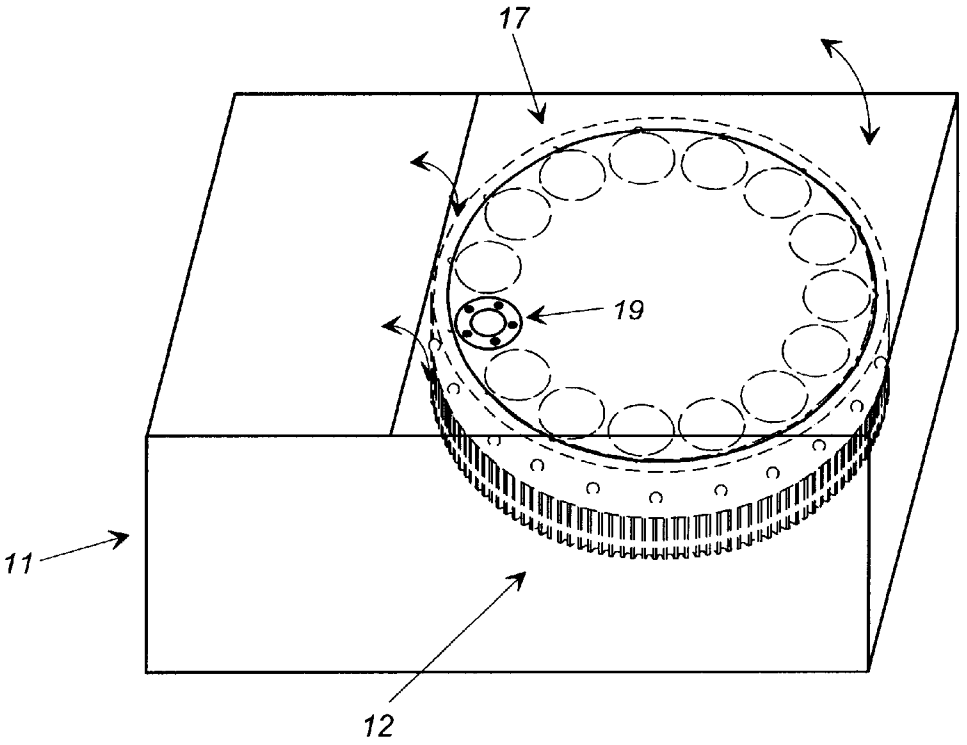
FIG. 7 is a drawing of one embodiment of a housing for the present invention including a lid and a pill loading hole.

Referring now to FIG. 7, a possible housing 11 for the pill dispenser is shown. The housing 11 includes a lid 17 that may be opened for access to the dispensing chamber 12 (shown as hidden in FIG. 7), and means for rotating the chamber. The lid 17 may include a loading chute 19 for loading pills into the chamber 12. The loading chute 19 may be any hole through which pills may be placed in the containment slots 14, and the hole preferably has a funnel-like shape for easy loading. To use the loading chute 19, the dispensing hole 15 needs to be covered. The chamber 12 is then rotated slot-by-slot so that pills may be loaded into each individual slot 14. The dispensing hole 15 may then be opened for later use. The loading chute 19 preferably includes a lid or some other means for closing the chute after the pills have been loaded.

Figure 6:
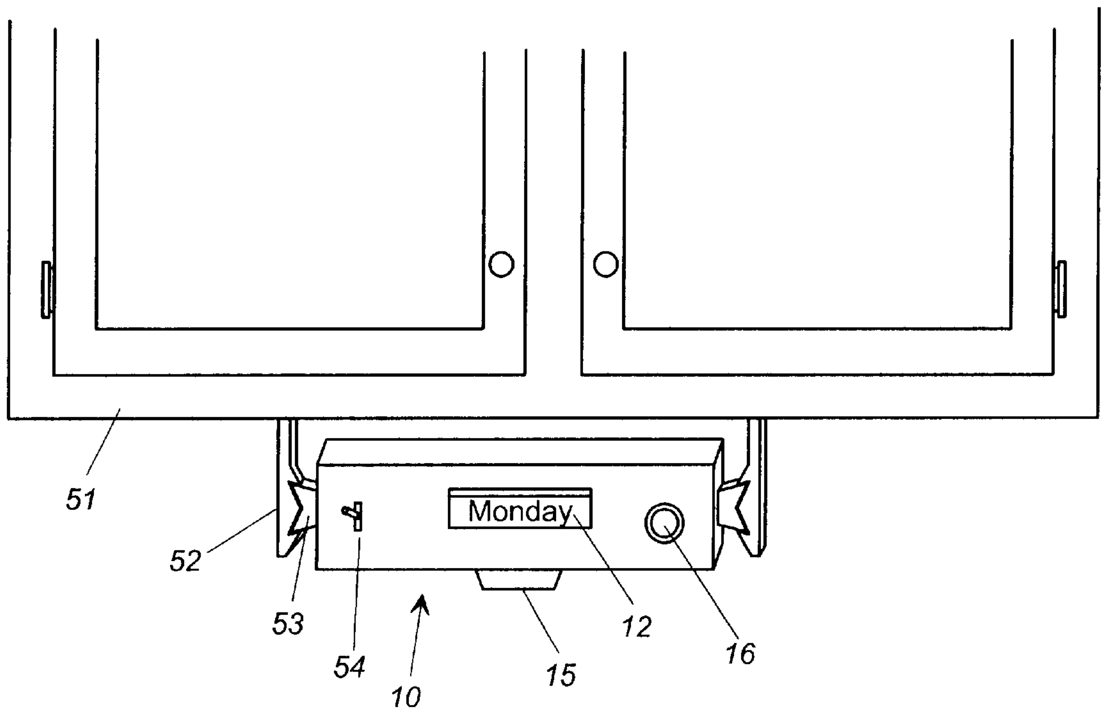
FIG. 6 is a drawing depicting one embodiment of the present invention, including a child safety key and rotating "day of the week" indicator.

It is contemplated that the pharmacist or user may load the pills into slots 14. Rather than supplying pill bottles, the pharmacist could instead place the pills in the device 10. When the user has consumed all of the pills in the device 10, he may return the device 10 to the pharmacist for a refill. Alternatively, the user may simply load the pills into the device 10 after purchase. This would reduce the number of times the user has to handle the cumbersome bottles, and provide a convenient method for maintaining and distributing the pills. In a preferred embodiment of the present invention, the chamber 12 may be removed from the device 10 to be refilled. The user may then take the chamber 12 to the pharmacist for filling, or purchase a new, pre-filled chamber 12 for placement inside the device 10. In this way, pill manufacturers may stock the shelves with pre-filled chambers for sale to the users. As shown in FIG. 6, this removable chamber 12 may also include the days of the week or calendar dates on the side of the chamber 12 which will be displayed when the chamber 12 rotates. This will assist the user in keeping track of dosages consumed. Alternatively, the device 10 may simply be opened and the chamber 12 filled with pills while remaining with the housing 11.

Also shown in FIG. 6 is that the pill dispensing device 10 can be mounted under a kitchen cabinet 51, for example, using suspending brackets 52 connected to the underside of kitchen cabinet 51 and fashioned to removably accept an interlocking portion 53 fixed to dispensing device 10. One can then slidably and removably attach dispensing device 10 to brackets 52. Dispensing device 10 is thereby conveniently suspended from kitchen cabinet 51.

Preferably, the motor and switch providing rotation to the chamber are designed so that the chamber's rotation is controlled as opposed to a freely rotating chamber. For instance, the chamber 12 will preferably rotate only enough to allow the next slot 14 to align perfectly with the dispensing hole 15. The chamber 12 should then stop rotating and not move until the switch 16 is activated again. One simple and inexpensive way to accomplish this controlled rotation is through the use of a gear system, having a spring loaded stopper 40 (snap switch) with a rotating lever-type stopper arm 41 as shown in FIGS. 1 and 4. When the switch 16 is activated, the stopper 40 releases and the motor 25 turns the chamber freely. The chamber wall may have outwardly protruding notches 20 such that rotation of the chamber stops when spring loaded rotating lever-type stopper arm 41 engages a notch. When the stopper arm 41 engages the notch 20, it forms a connection with the stopper 40 which interrupts electric current to motor 25. This process is repeated each time switch 16 is activated. This controlled rotation means is included by way of example only and is not intended to limit the scope of the present invention.

Another preferred feature of the present invention is a system to prevent unwanted users from having access to the pills. This may also be considered a child safety feature. As described so far, any user could activate switch 16 and obtain a pill. This would be an undesirable feature if small children were in the home. To prevent unwanted access to the pills, a key system 54 as illustrated in FIG. 6 may be devised that would limit users. The switch 16 may easily be configured so that it does not activate the motor unless a key 54 or other type of triggering device is inserted into the device 10. This would avoid accidental or unwanted pill dispensing. The key device 54 is discussed as an example only, and it should be recognized that any type of security system that avoids unwanted pill dispensing may be utilized.

Figure 8:
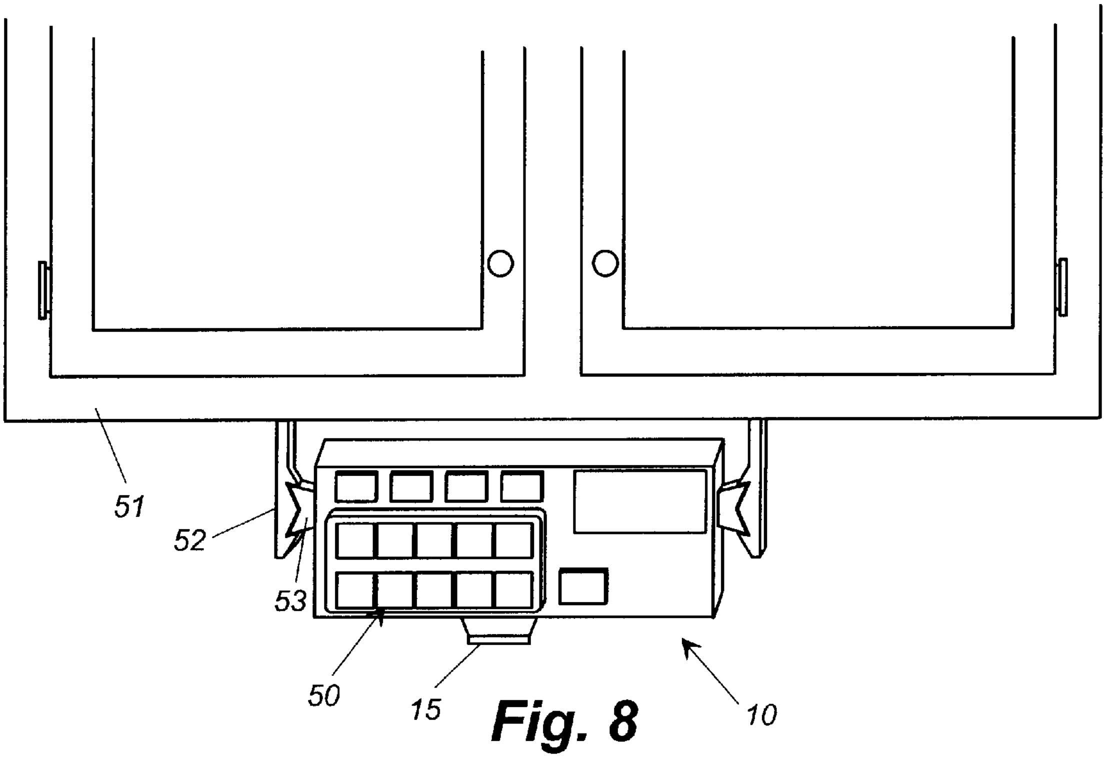
FIG. 8 is a drawing depicting another embodiment of the claimed invention including a programmable user interface.

Referring now to FIG. 8, another embodiment of the present invention utilizes a computerized control pad 50 to control distribution of the pills. The computer may be programmed with date and time so that pills are dispensed only when needed. Once the user has obtained a pill, the chamber 12 will not rotate again until the designated time for another dosage. In addition, the computerized system may utilize a numeric combination keypad as the security device. Further, the computerized system may also include an alarm or other device so that the user may be notified when it is time to take particular medication or pills. The device may also automatically dispense the pills to a tray or holding device to be taken by the user at their convenience. It should be appreciated that the present disclosure does not include details regarding the computerized control pad. The design of such a computer interface is well within the ordinary skill in the art, and would be designed similar to the control interface of microwave ovens or VCRs.

Figure 9A:
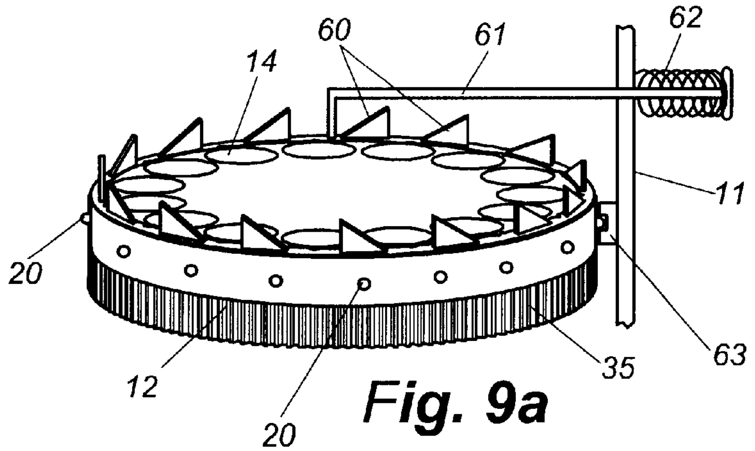
FIG. 9*a* shows a rotating chamber with teeth projections and plunger to provide manual rotation of the chamber.
Figure 10A:
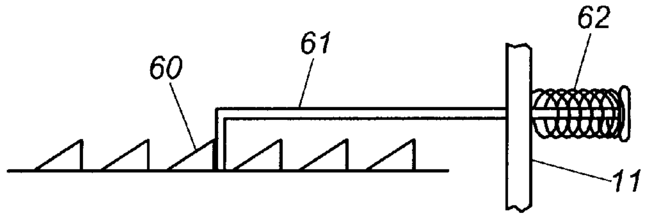
FIGS. 10*a*–10*d* illustrate the plunger engaging the teeth projections to rotate the chamber manually.
Figure 10B:
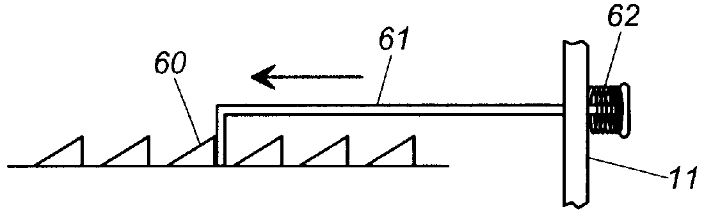
Figure 10C:
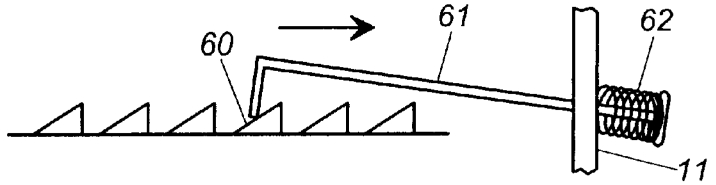
Figure 10D:
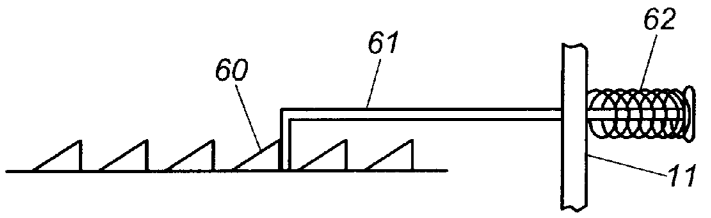

In some cases it may be preferred to use a manual mechanism to rotate chamber 12 a fixed distance. FIGS. 9*a* and *b,* and 10*a, b, c,* and *d,* show a simple and inexpensive means to produce manual rotation. As seen in FIG. 9*a,* chamber 12 has a series of angled teeth projections 60 attached to the top of chamber 12 and projecting vertically. Rigid plunger or handle 61 has a spring 62 on the portion of plunger 61 external to housing 11. The internal portion of plunger 61 engages tooth projection 60. FIGS. 10*a, b, c,* and *d,* illustrate how plunger 61 rotates chamber 12. When a user pushes the external portion of plunger 61 inward, plunger 61 pushes against the flat portion of tooth projection 60 and rotates chamber 12 while spring 62 is compressed. When the user releases plunger 61, spring 62 pushes plunger 61 outward. As plunger 61 moves outward, the internal portion of plunger 61 moves up the angled portion of an adjacent tooth projection 60 and falls behind the flat portion of an adjacent tooth projection 60. The chamber 12 is now ready for a second rotation to the next pill containment slot 14. The tooth projections may also be placed at other sites on the chamber and the plunger may also function in other positions or as a lever. Because of the simplicity of the present invention, no mechanism is required to prevent reverse rotation of chamber 12. As chamber 12 rests on the bottom of housing 11 there is sufficient friction to prevent reverse rotation.

Figure 9B:
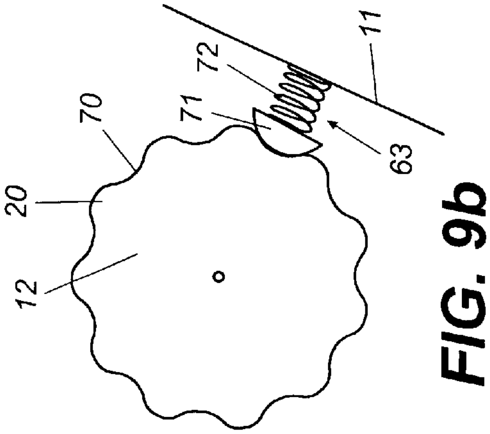
FIG. 9*b* shows a stopper tab to stop rotation of the chamber.

In some cases, it may be desirable to have a stopper mechanism to prevent reverse rotation of chamber 12. FIGS. 9*a* and *b,* and 11 illustrate a stopper tab. The inside portion of housing 11 contains a flexible stopper tab 63 which engages notch 20 on the side of chamber 12 during forward rotation. A slight force with the plunger or handle 62 as the notch engages stopper tab 63 will bend stopper tab 63. As the stopper tab 63 bends, the notch 20 passes the stopper tab 63, and the notch will prevent reverse rotation as it encounters tab 63, if chamber 12 tends to rotate in reverse. A similar ball and socket tab could also be used as shown in FIG. 9*b.* Notches 20 on chamber 12 could be arranged to form a pocket or socket 70 to accommodate the ball-like head 71 of tab 63. Head 71 is biased towards socket 70 by spring 72.

Figure 11:
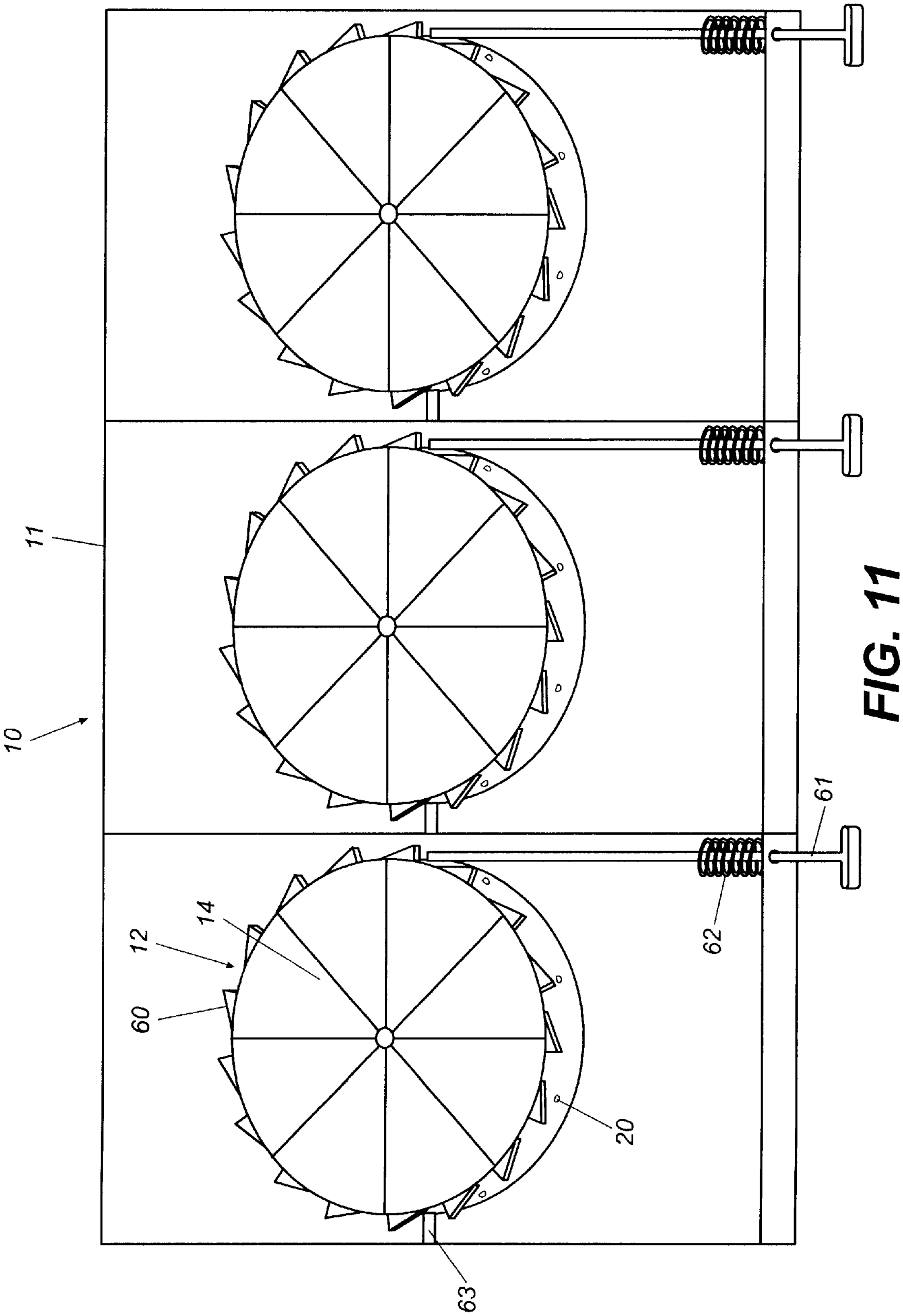
FIG. 11 is a drawing depicting a variation of the device shown in FIG. 9*a*.

FIG. 11 shows a variation of the device shown in FIG. 9. The teeth projections 60 project horizontally instead of vertically, and handle or plunger 61 has spring 62 on the inside of housing 11. In this case spring 62 is stretched as plunger 61 pushes against tooth projection 60. FIG. 11 also shows how the device of the present invention can be constructed with multiple chambers for high volume use or for different time periods such as morning, noon, and night. The chambers may be arranged horizontally or vertically.

Figure 12:
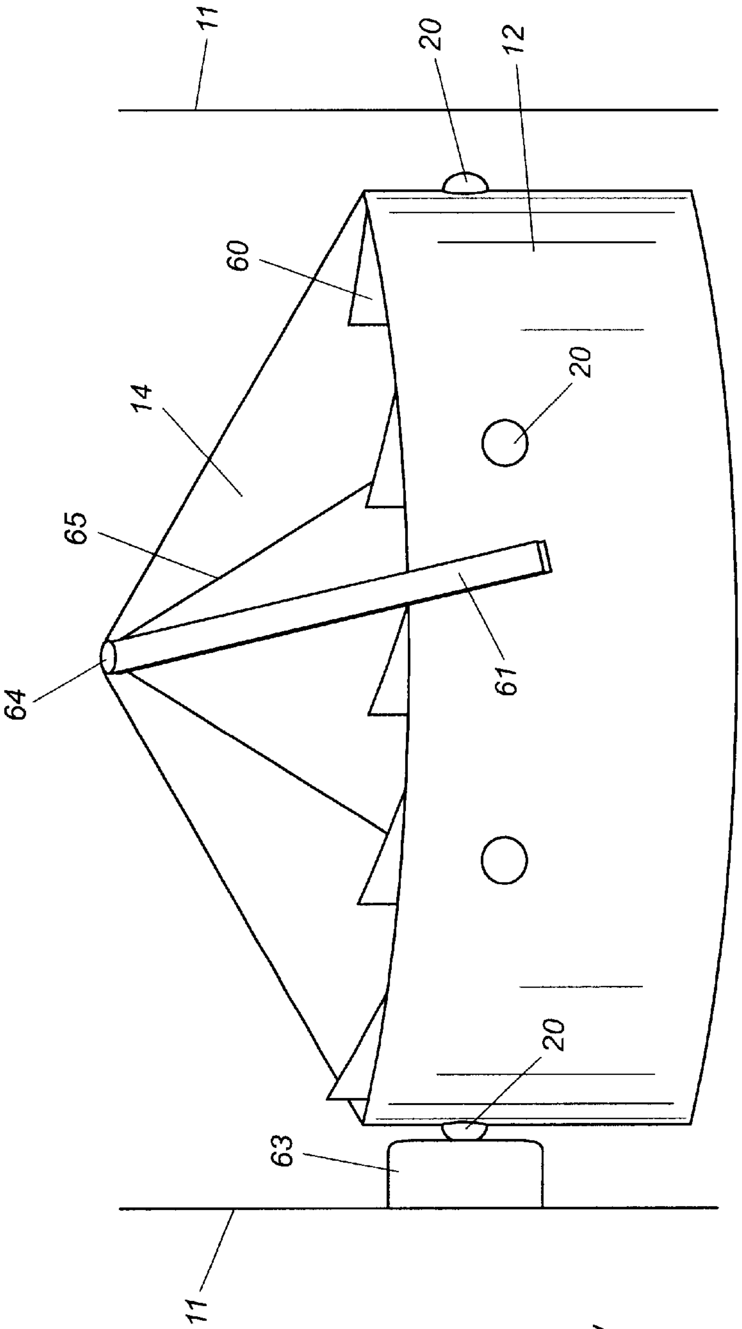
FIG. 12 shows an alternate embodiment where a handle pivots from the chamber axle to rotate the chamber.

FIG. 12 shows another embodiment of the present invention where the rigid handle or lever 61 for rotating chamber 12 pivots on the axle 64 of chamber 12 and extends outward from the side of housing 11. This lever 61 requires no spring for retraction as seen in FIGS. 9, 10, and 11, since it can be conveniently manually moved back and forth. However, the lever can incorporate a spring at the pivot point on axle 64 to bias lever 61 to the right or left as desired.

Figure 13:
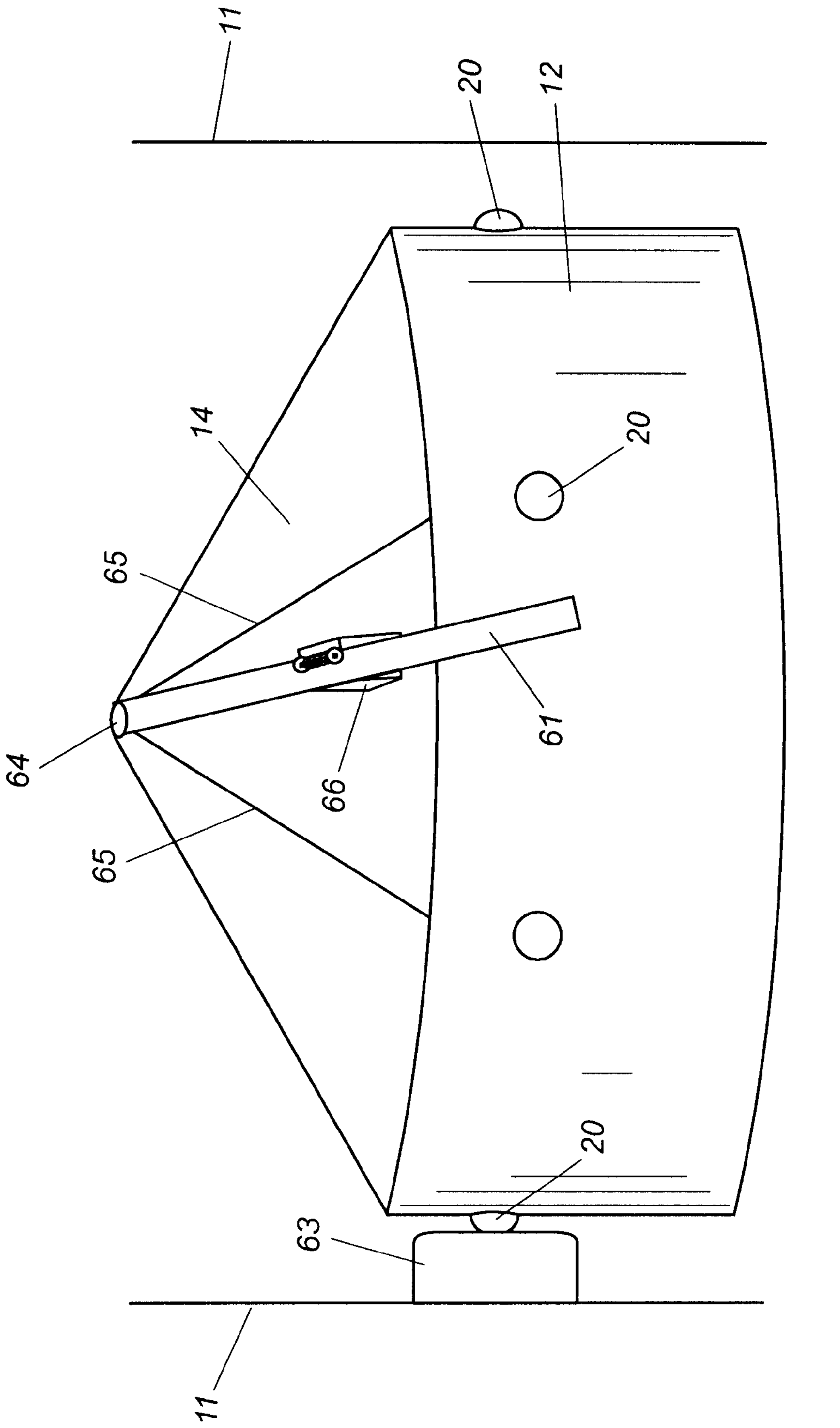
FIG. 13 illustrates a variation of the device in FIG. 12 where teeth projections are eliminated and replaced by a hinged tab.

FIG. 13 shows the preferred embodiment of the present manually operated invention, which does not require teeth projections 60 on chamber 12. This embodiment has a rigid handle or lever 61 similar to that shown in FIG. 12 except that it has a hinged flexible tab 66 which will rotate forward, or to the right, for example, as the lever is moved to the left and the tab 66 encounters partition 65 of slot 14. Because tab 66 is hinged to rotate only to the right, for example, it can be moved over partition 65 by lever 61 as tab 66 rotates upward. Once tab 66 is over partition 65, the lever can be moved to the right and tab 66 will engage partition 65. Since tab 66 is hinged to rotate only to the right but not to the left, it will put force on partition 65 as the lever 61 is moved to the right and the chamber 12 will then rotate forward or to the right. The hinged tab may be constructed to provide either right or left rotation as the user needs. The lever may incorporate a spring at the pivot point on axle 64 to bias lever 61 to the right or left as desired. The lever 61 extends outside housing 11 through an opening. The width of the opening controls the extent of rotation. The opening may be variable in width. Instead of partitions circular slots with projections may be used to engage tab 66.

Figure 15:
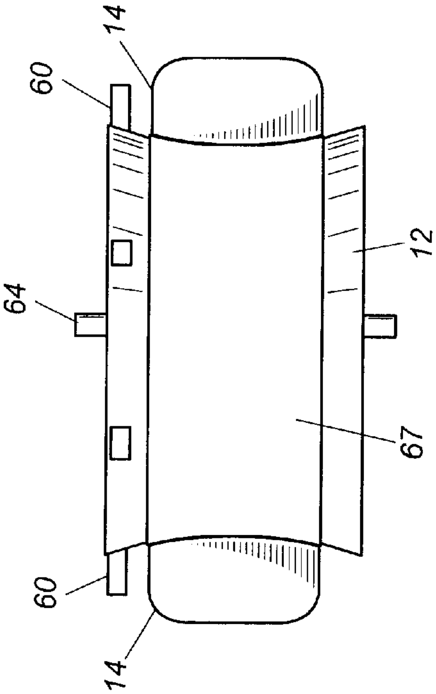
FIG. 15 is a front elevational view of the belt arrangement taken through line a—a of FIG. 14.
Figure 14:
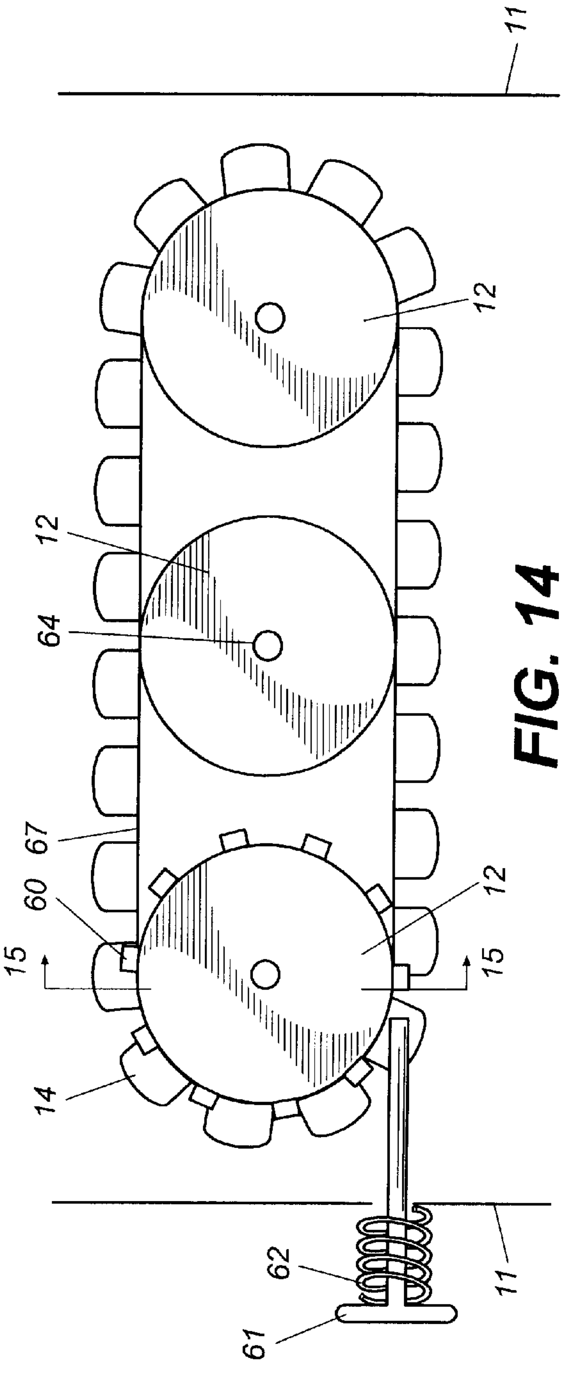
FIG. 14 illustrates yet another embodiment of the present invention using a belt arrangement with the chambers.

FIG. 14 shows a further embodiment of the present invention where chambers 12 act as wheels connected in series by belt 67, as is seen customarily with a fan belt or pulley belt arrangement. A front view of this arrangement is seen in FIG. 15 along line a—a. Separate slots 14, or containers, are attached to belt 67. A chamber 12 adjacent to housing 11 can contain teeth projections 60, and a handle, plunger, or lever 61 as shown in FIGS. 9–13 to rotate the chamber 12. The frictional nature of belt 67 as it engages chambers 12 will provide enough friction to prevent reverse rotation of the chambers 12. This embodiment allows for numerous slots in a relatively small space. The assembly of wheels, belt, and slots can be replaced with another assembly. The device may also contain multiple assemblies. The assembly may be arranged in horizontal or vertical positions.

Because of the simplicity of the present invention, it can be miniaturized using either the motor version or handle versions so that the device can be portable and carried conveniently. Such a miniaturized version would preferably be 6 to 8 inches long, 3 to 4 inches wide, and: to 1" thick. Other ranges of sizes, however, are within the scope of the present invention.

The devices shown in FIGS. 9–15 have additional features. They have (1) a housing having at least one opening through which pills are dispensed, when the chamber is rotated; (2) notations on the chamber or belt corresponding to a calendar, such markings being visible to the user, to assist the user in determining which day to dispense pills; (3) removable, replaceable chambers or assemblies; (4) a loading chute that may be used to load pills into slots; (5) a programmable computer control for rotating the chamber; and (6) the chambers or assemblies may be arranged horizontally or vertically.

While various modifications and changes of the device described herein will be apparent to one having ordinary skill in the art, such changes are included in the spirit and scope of this invention, and the invention should not be limited by the specific embodiments described herein.

We claim:

1. A pill dispensing device comprising:

a) a cylindrical chamber having walls, a plurality of slots, and a plurality of gear teeth;

b) an electric motor having a shaft with a screw drive engaging said gear teeth to rotate said chamber, said shaft being parallel to said walls;

c) a housing for said chamber, said housing having at least one opening though which one or more pills are dispensed from said slots;

d) an electric switch on said housing which can be operated manually by a user as desired to activate said motor to rotate said chamber;

e) said walls having an external surface, said external surface having notches protruding outwardly;

f) a spring-loaded stopper having a rotating arm which engages said notches to automatically stop rotation of said chamber so that one or more pills contained in said slot are dispensed through said opening; and g) said motor and said stopper being positioned adjacent to said walls of said cylinder.

2. The device of claim 1 wherein said chamber is marked with notations corresponding to a calendar, such markings being visible to the user, to assist the user in determining which day to dispense pills.

3. The device of claim 2 wherein said chamber may be removed from said housing and replaced with a different chamber.

4. The device of claim 3 wherein said housing further comprises a loading chute that may be used to load pills into the slots.

5. The device of claim 4 wherein said housing includes a programmable computer control for rotating said chamber.

6. The device of claim 5 wherein said device can be slidably and removably suspended from a cabinet.

7. The device of claim 6 further comprising multiple chambers.

8. The device of claim 7 wherein said chamber is rotatable manually with a mechanical system.

9. A method for dispensing pills comprising:

a) providing a cylindrical chamber in a housing, said chamber having walls with outwardly protruding notches, a plurality of slots, and a plurality of gear teeth;

b) filling said slots with one or more pills;

c) activating an electric switch on said housing manually as desired, thereby activating a motor adjacent to said chamber, said motor having a shaft with a screw drive which engages said gear teeth and rotates said chamber, said shaft being parallel to said walls; and d) stopping said chamber from rotating automatically by engaging said notches with a spring-loaded stopper having a rotating arm adjacent to said chamber so that one or more pills contained in said slot are dispensed through at least one opening in said housing.

10. The method of claim 9 wherein said chamber is marked with notations corresponding to a calendar, such markings being visible to the user, to assist the user in determining which day to dispense the pills.

11. The method of claim 10 wherein said chamber may be removed from said housing and replaced with a different chamber.

12. The method of claim 11 wherein said housing further comprises a loading chute that may be used to load pills into the slots.

13. The method of claim 12 wherein said housing includes a programmable computer control for controlling the rotation of said chamber.

14. The method according to claim 13 wherein said device can be slidably and removably suspended from a cabinet.

15. The method of claim 14 further comprising multiple chambers.

16. The method of claim 15 wherein said chamber is rotatable manually with a mechanical system.

* * * * *